United States Patent [19]

Casadio

[11] 4,054,324
[45] Oct. 18, 1977

[54] SPOKED WHEEL PARTICULARLY FOR MINIATURE VEHICLES

[76] Inventor: Pietro Casadio, Via Jacopo di Paolo, 34, Bologna, Italy

[21] Appl. No.: 594,489

[22] Filed: July 9, 1975

[30] Foreign Application Priority Data

July 11, 1974 Italy .................................. 3442/74

[51] Int. Cl.² ............................................. B60B 1/04
[52] U.S. Cl. ...................................... 301/56; 301/58; 301/60; 301/105 B; 301/108 SC
[58] Field of Search ..................... 301/66, 74, 75, 78, 301/54–60, 64 R, 64 SH, 9 S, 9 SC, 105 B, 108 SC, 108 S; 29/159.01, 159.02

[56] References Cited

U.S. PATENT DOCUMENTS

| 768,047 | 8/1904 | Heitger | 301/64 R |
| 1,969,108 | 8/1934 | Tarbox | 29/159.02 |

FOREIGN PATENT DOCUMENTS

| 6,192 | 8/1933 | Austria | 301/78 |
| 102,342 | 11/1916 | United Kingdom | 301/78 |

*Primary Examiner*—Robert B. Reeves
*Assistant Examiner*—Charles A. Marmor

*Attorney, Agent, or Firm*—Guido Modiano; Albert Josif

[57] ABSTRACT

Spoked wheel particularly for miniature vehicles, comprising a tubular member constituting the wheel hub. At one end the latter is provided with an outer collar. A washer is laid over the tubular member. A sleeve overlies the tubular member between the washer and the collar such as to define two respective annular grooves therebetween. A pair of rims is arranged concentrically with the tubular member and having an inner edge which defines an axially projecting annular ridge. The rims are arranged in a mirror image relationship to each other, so that they also act as shoulder members for the beads of the wheel tire. A ring spacer concentrical to the tubular member and intervening between the rims, defines together with the rims respective annular seats. A pair of spoke-carrying rings is positioned within the annular seats and each provided with circumferentially arranged projections at equal angles apart for hooking a bent over wire over and around the projections. Rivets and a locking nut are provided for clamping in one component the rims and spacers and spoke-carrying rings, and the other end of the tubular member is clenched for locking axially the washer and sleeve against the collar.

4 Claims, 7 Drawing Figures

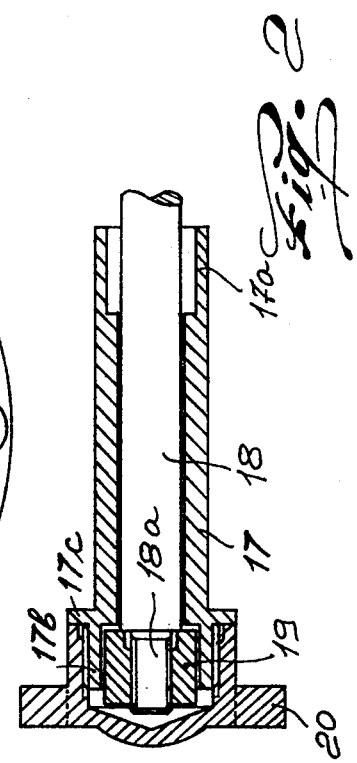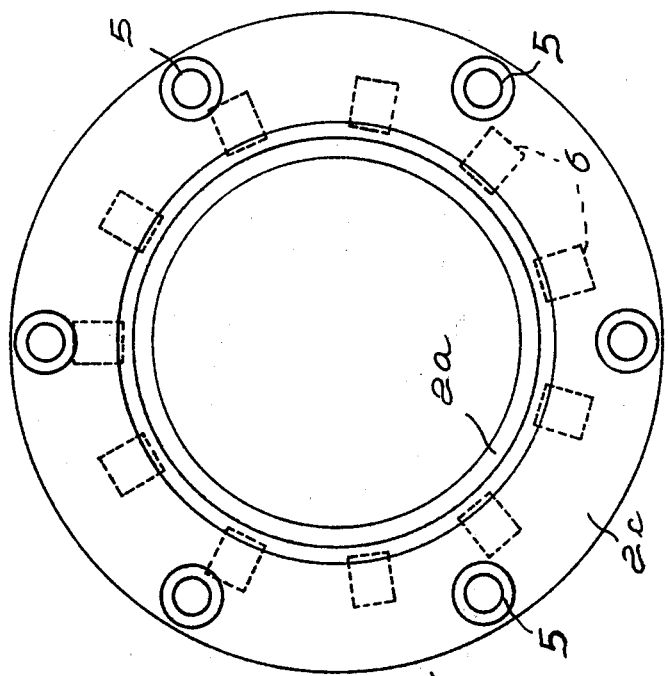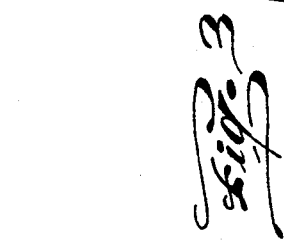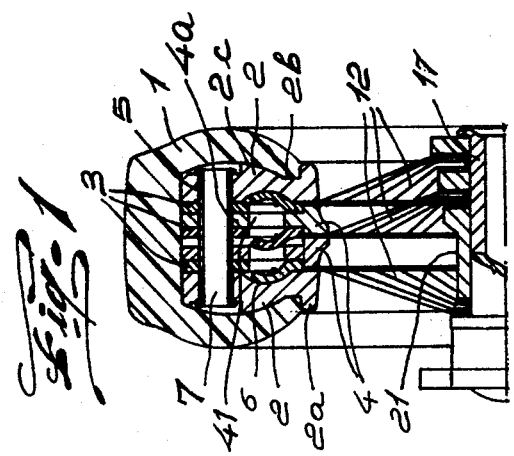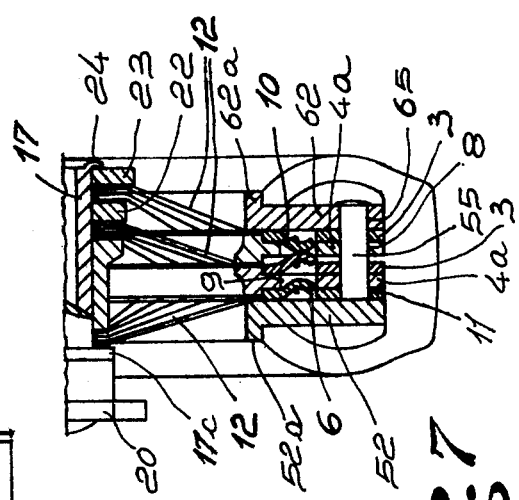

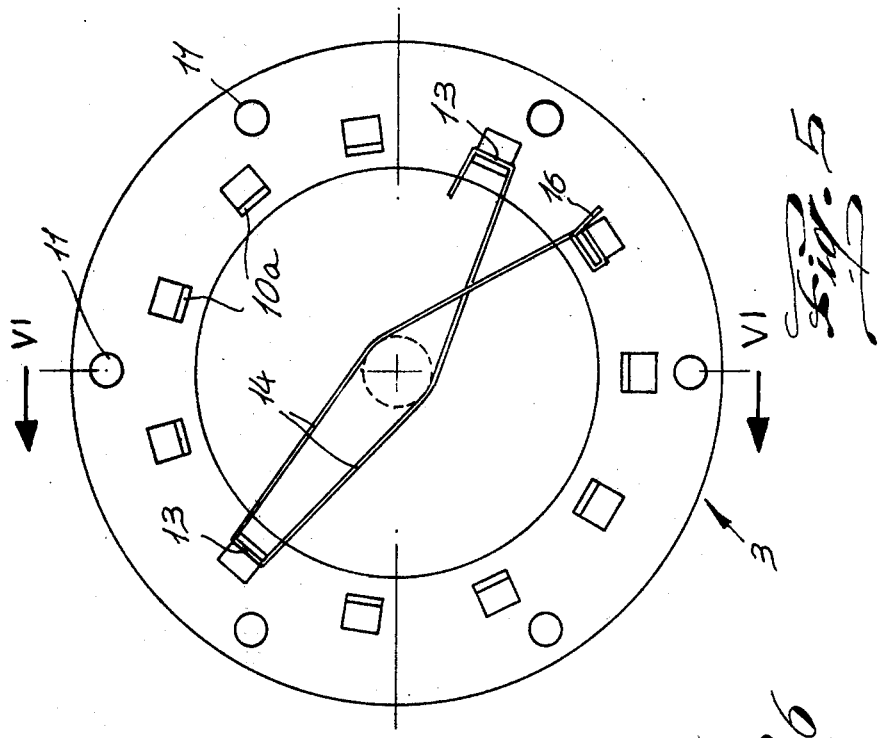
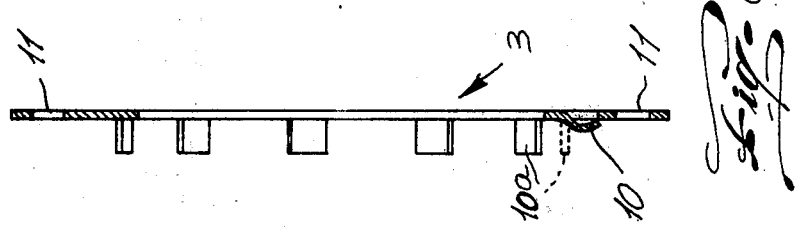
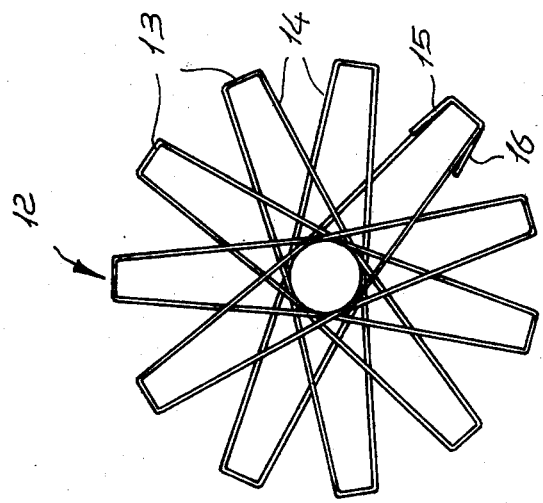

SPOKED WHEEL PARTICULARLY FOR MINIATURE VEHICLES

BACKGROUND OF THE INVENTION

This invention relates to a spoked wheel, particularly for miniature vehicles. The instant wheel is suitable for use, for example, in motor bike and vehicle models.

The conventional reproduction of spoked wheels are somewhat complex structures, clumsily executed and hardly faithful replicas of their full-scale counterparts. Attempts are commonly made to conceal such inaccuracies by enhancing those details which show best and adopting contrasting colors.

It is an object of this invention to provide a spoked wheel which can be easily manufactured, at reduced cost, and as far as possible reproducing the outward appearance of the traditional full-size spoked wheels.

SUMMARY OF THE INVENTION

The above object is achieved by a spoked wheel characterized in that it comprises a tubular member constituting the hub of the wheel and having at one end an outer collar, at least one washer overlying said tubular member, a sleeve overlying said tubular member between said washer and said collar, thereby defining with said washer and said collar two respective annular grooves, a pair of rims arranged concentrically with said tubular member and having an inner edge which defines an annular ridge which projects axially, said rims being arranged in a mirror image relationship to each other, thereby said ridges act as shoulders for the wheel tire beads, at least one ring spacer concentric to said tubular member and intervening between said rims, said ring spacer having a thickness dimension which is lower than said sleeve length and defining with the rims respective annular seats, at least one pair of spoke carrying rings located within said annular seats and provided each with projections spaced apart circumferentially at equal angles for hooking a bent-over wire around said projections such as to present radial lengths extending from said spacer to said rims, said radial lengths being tangential to said tubular member at said annular grooves, means for clamping together as one component said rims and ring spacers and spoke carrying rings, and means for locking axially said washer and sleeve against said collar.

BRIEF DESCRIPTION OF THE DRAWINGS

Further features of the invention will become more apparent by making reference to the following exemplary description of a preferred embodiment thereof, in conjunction with the attached drawings, wherein:

FIG. 1 is a diametrical cross-sectional view of a three spoke sets type of wheel, showing only the upper half of the wheel section, the lower half being identical;

FIG. 2 is a longitudinal section view of the wheel hub;

FIG. 3 is a front elevational view of a rim;

FIG. 4 is a front elevational view of a spoke set;

FIG. 5 is a front elevational view of a spoke-carrying ring; and

FIG. 6 is a sectional view taken along the line VI—VI of FIG. 5.

FIG. 7 is a diametrical cross-sectional view of a modified embodiment of a three spoke sets type of wheel, showing only the lower half of the wheel section the upper half being identical.

DESCRIPTION OF A PREFERRED EMBODIMENT

With reference to the drawings, the wheel in accordance with the invention comprises two outer rims 2, wherebetween three spoke-carrying rings 3 and two ring spacers 4 are located. As shown in FIG. 1, illustrating a first embodiment of the invention, the rims 2 are arranged in a mirror relationship to each other, and configurated along their outer face with an annular ridge 2a which projects axially from the inner edges of the rims, with an annular groove 2b, and with a crowned or convex surface 2c. The ridges 2a form a shoulder portion for the beads of the tire 1, the side portions whereof rest on the crowned surfaces 2c. The rims 2 extend in a radial direction, and are provided at their peripheral edge with a plurality of through holes 5 opening into recesses formed in the outer faces of the rims 2. The holes 5 are spaced apart equiangularly along the rim 2.

The inner face of each rim is provided, at the portion thereof located between the holes 5 and the groove 2b, with a plurality of recesses 6, which are an odd number and spaced at equal distances from each other.

In the embodiment of the invention shown in FIG. 7, the rims 52, 62 (similar to the rims 2) are flat and present at their inner edges annular shoulders 52a, 62a for supporting the beads of the tire. Hence, the tire side portions are separated from the outer faces of the rims 52, 62, whereby the tire exhibits, differently from what is represented in the embodiment of FIG. 1, a degree of resiliency.

Whereas in the embodiment of FIG. 1 the rigid connection between the rims 2 and rings 3 is achieved by means of rivets 7, the ends whereof are clenched outwardly, in the embodiment shown in FIG. 7 the connection is effected by clenching a pin 55 formed as one piece with the rim 52. Each ring spacer 4 (FIG. 1) has its inner edge radiused to that of the rim 2 or 52, 62, wherefrom a flat crown member 4a of smaller thickness extends outwards which defines on opposite faces annular seats wherein the spoke-carrying rings 3 are positioned. Obviously, the crown members 4a are provided with holes 8 receiving the rivets 7 or pins 55. Furthermore, the crown members 4a are provided with quadrangular bores or holes 41, each facing a respective recess 6.

Each spoke-carrying ring 3 (FIGS. 1, 5 and 6) is formed with a set of through holes 11 receiving the rivets 7 or pins 55.

In the proximity of the inner edge of each ring 3, tabs 10a are formed which, before the respective set of spokes 12 is assembled, project perpendicularly from one face of the ring (FIG. 6), whereas at later stage, in order to retain the spoke set, these are bent over against that same ring face until a position is reached which coresponds to 10 in FIG. 6. The tabs 10 of the ring are equal in number to the recesses 6 and holes 9, thereby they can be received in the recesses 6 or holes 9.

Each set of spokes 12 comprises a single piano steel wire one end 16 whereof is attached to a tab 10. The wire is stretched radially in lengths or portions 14 such as to be hooked over a diametrically opposed tab 10, bent over, thereby crossing over the previously stretched wire length, and then hooked over another tab adjacent to the one whereto the end 16 is attached.

A star-like configuration is thus obtained, wherein the end 15 is attached to the same tab whereto the end 16 is secured.

By bending the tabs 10 toward the plane of the ring 3, a first tensioning effect is achievd on the wire lengths 14 forming the spokes of the wheel. A further and final tensioning of the lengths 14 is obtained by clamping the rims 2, 52, 62 and rings 3, 4 in one component, concurrently with the clamping of the various elements making up the wheel hub.

The hub (FIGS. 1, 2 and 7) comprises a metal tubular member 17, the hollow inside whereof has at the end portions 17a, 17b a larger diameter than at the middle portion thereof, the wheel axle 18 being inserted and supported rotatably thereby. The axle 18 is provided with a threaded tail piece 18a which extends into the portion 17b and whereon a nut 19 is threadably engaged to prevent the wheel from sliding off its axle. On the portion 17b, there is threaded a ring nut 20, in abutment relationship with a collar 17c of the tube 17, and which is cup-shaped and covers the outer end of the hub. Positioned on the tube 17, there are the sleeve 21 and the two washers 22, 23 the outermost whereof, 23, is made preferably of metal, whereas the other washer, 22, and sleeve 21 may be of a plastic material.

The assembling of the wheel described hereinabove is effected by first arranging the lengths 14 of the spoke set 12 tangential to the tube 17 within the annular grooves defined between the collar 17c and sleeve 21, between the latter and the washer 22, and between the washer pair, 22, 23, and then by carrying out in one operation the clenching of the tube 17 end, opposed to the ring nut 20, and the clamping together in one component of the rims 2, 52, 62 and rings 3, 4.

As is best shown in FIG. 1, the final stretching of the lengths 14 in the spoke sets 12 comes from the fact that since the sleeve 21 has a length dimension which is greater than the thickness of the ring spacers 4, the lengths 14 acquire a conical configuration.

The invention just described lends itself to numerous variations and modifications. Thus, for example, each spoke set 12, rather than being assembled on the ring 3, may be carried out separately as an independent element. Moreover, instead of being obtained from a single wire wound so as to form a plurality of loops, the spoke set may be composed of a number of substantially rectangular single loops which are hooked with their shorter lengths over diametrically opposed tabs 10 and, therefore, present in even numbers on the rings 3.

I claim:

1. A spoked wheel particularly for miniature vehicles, characterized in that it comprises a tubular member constituting a wheel hub and having at one end an outer collar, at least one washer overlying said tubular member, a sleeve overlying said tubular member between said washer and said collar such as to define two respective annular grooves therebetween, a pair of rims arranged concentrically with said tubular member and each rim having an inner edge which defines an axially projecting annular ridge, said rims being arranged in a mirror image relationship to each other, thereby said ridges also act as shoulder members for the beads of the wheel tire, at least one ring spacer concentrical to said tubular member and intervening between said rims, said spacer having a thickness dimension which is smaller than the length of said sleeve and defining together with the rims respective annular seats, a spoke forming wire, at least one pair of spoke-carrying rings positioned within said annular seats and each provided with circumferentially arranged projections at equal angles apart for stretching said spoke forming wire between successive diametrically opposite said projections and bending it over said projections thereby obtaining radial lengths thereof passing between said spacer and said rims and extending tangentially past said tubular member at said annular grooves, means for clamping in one component said rims and spacers and spoke-carrying rings, and means for locking axially said washer and sleeve against said collar.

2. A spoked wheel according to claim 1, characterized by the fact that said tubular member, at the end thereof which is provided with said collar, is provided with a hollowed portion having an inner diameter dimension which is greater than the inner diameter of the tubular member, for receiving a locking nut for the wheel axle led through said tubular member, said hollowed portion being further provided with outer threads for the coupling of a cupped ring nut to close said hub.

3. A spoked wheel according to claim 1, characterized in that each spoke-carrying ring is provided with projecting tabs arranged perpendicular to the plane of said ring and adapted for bending in a radial direction and outwardly during the clamping in one component of the wheel, the wire forming the wheel spokes being hooked over and around said tabs.

4. A spoked wheel according to claim 1, wherein two said washers are provided defining a third annular groove therebetween, wherein two said ring spacers are provided defining together with said rims three said annular seats, wherein three said spoke carrying rings are provided and wherein one among said radial lengths of the spoke forming wire passes between said two ring spacers, and wherein said rims and said ring spacers and said spoke-carrying rings have seats for receiving said projections and holes for receiving rivets therethrough to thereby clamp into one component said rims and ring spacers and spoke carrying rings.

* * * * *